(12) United States Patent
Barrera et al.

(10) Patent No.: US 7,730,547 B2
(45) Date of Patent: Jun. 1, 2010

(54) SMART MATERIALS: STRAIN SENSING AND STRESS DETERMINATION BY MEANS OF NANOTUBE SENSING SYSTEMS, COMPOSITES, AND DEVICES

(75) Inventors: Enrique V. Barrera, Houston, TX (US); Satish Nagarajaiah, Sugar Land, TX (US); Prasad Dharap, Houston, TX (US); Li Zhiling, Houston, TX (US); Jong Dae Kim, Houston, TX (US)

(73) Assignee: William Marsh Rice University, Houston, TX (US)

( * ) Notice: Subject to any disclaimer, the term of this patent is extended or adjusted under 35 U.S.C. 154(b) by 1080 days.

(21) Appl. No.: 10/542,697

(22) PCT Filed: Jan. 23, 2004

(86) PCT No.: PCT/US2004/001708

§ 371 (c)(1),
(2), (4) Date: Mar. 9, 2006

(87) PCT Pub. No.: WO2004/065926

PCT Pub. Date: Aug. 5, 2004

(65) Prior Publication Data

US 2006/0253942 A1 Nov. 9, 2006

Related U.S. Application Data

(60) Provisional application No. 60/442,134, filed on Jan. 23, 2003.

(51) Int. Cl.
G01N 23/00 (2006.01)
(52) U.S. Cl. .......................... 850/21; 850/4; 250/306; 438/52; 423/447.1

(58) Field of Classification Search ................. 250/306; 423/447.1; 438/52; 850/4, 21
See application file for complete search history.

(56) References Cited

U.S. PATENT DOCUMENTS 6,146,227 A * 11/2000 Mancevski .................... 445/24

(Continued)

FOREIGN PATENT DOCUMENTS

WO    WO 98/39250    9/1998

(Continued)

OTHER PUBLICATIONS

Iijima, "Helical microtubules of graphitic carbon," Nature, 354, pp. 56-58 (1991).

(Continued)

*Primary Examiner*—David A Vanore
(74) *Attorney, Agent, or Firm*—Winstead PC

(57) ABSTRACT

The present invention is directed toward devices comprising carbon nanotubes that are capable of detecting displacement, impact, stress, and/or strain in materials, methods of making such devices, methods for sensing/detecting/monitoring displacement, impact, stress, and/or strain via carbon nanotubes, and various applications for such methods and devices. The devices and methods of the present invention all rely on mechanically-induced electronic perturbations within the carbon nanotubes to detect and quantify such stress/strain. Such detection and quantification can rely on techniques which include, but are not limited to, electrical conductivity/conductance and/or resistivity/resistance detection/measurements, thermal conductivity detection/measurements, electroluminescence detection/measurements, photoluminescence detection/measurements, and combinations thereof. All such techniques rely on an understanding of how such properties change in response to mechanical stress and/or strain.

26 Claims, 8 Drawing Sheets

U.S. PATENT DOCUMENTS

| | | | |
|---|---|---|---|
| 6,276,214 B1 | | 8/2001 | Toyoaki et al. |
| 6,457,350 B1* | | 10/2002 | Mitchell ..................... 73/105 |
| 6,716,409 B2* | | 4/2004 | Hafner et al. ............ 423/447.1 |
| 6,780,664 B1* | | 8/2004 | Goruganthu et al. .......... 438/52 |
| 6,824,755 B2* | | 11/2004 | Colbert et al. ........... 423/447.1 |
| 6,887,365 B2* | | 5/2005 | Naughton .................. 205/104 |
| 6,950,296 B2* | | 9/2005 | Carnahan ................... 361/233 |
| 7,011,771 B2* | | 3/2006 | Gao et al. ................... 252/502 |
| 7,161,148 B1* | | 1/2007 | Givargizov et al. ......... 250/306 |
| 7,170,055 B1* | | 1/2007 | Deng et al. ................. 250/306 |
| 7,220,962 B2* | | 5/2007 | Kawakatsu ................ 250/306 |
| 7,309,863 B2* | | 12/2007 | Kawakatsu ................ 250/306 |
| 2002/0172820 A1 | | 11/2002 | Hannes et al. |

FOREIGN PATENT DOCUMENTS

| | | |
|---|---|---|
| WO | WO 00/14476 | 3/2000 |
| WO | WO 00/17101 | 3/2000 |
| WO | WO 01/30694 | 5/2001 |
| WO | WO 03/005450 | 1/2003 |

OTHER PUBLICATIONS

Iijima et al., "Single-shell carbon nanotubes of 1-nm diameter," Nature, 363, pp. 603-605 (1993).
Bethune et al., "Cobalt-catalysed growth of carbon nanotubes," Nature, 363, pp. 605-607 (1993).
Ebbesen, "Carbon Nanotubes," Annu. Rev. Mater. Sci., 24, pp. 235-264 (1994).
Zhou et al., "Materials Science of Carbon Nanotubes: Fabrication, Integration, and Properties of Macroscopic Structures of Carbon Nanotubes," Acc. Chem. Res., 35(12), pp. 1045-1053, (2002).
Dai, "Carbon Nanotubes: Synthesis, Integration, and Properties," Acc. Chem. Res., 35(12), pp. 1035-1044 (2002).
Yakobson et al., "Fullerene Nanotubes: C1,000,000 and Beyond," American Scientist, 85, pp. 324-337 (1997).
Ajayan, "Nanotubes from Carbon," Chem. Rev., 99, pp. 1787-1799 (1999).
Baughman et al., "Carbon Nanotubes—the Route Toward Applications," Science, 297, pp. 787-792 (2002).
Ausman et al., "Nanostressing and Mechanochemistry," Nanotechnology, 10, pp. 258-262 (1999).
Ruoff et al., "Mechanical Properties of Carbon Nanotubes: Theoretical Predictions and Experimental Measurements," C.R. Physique, 4 pp. 993-1008 (2003).
Bozhko et al., "Resistance vs. Pressure of Single-Wall Carbon Nanotubes," Appl. Phys. A, 67, pp. 75-77 (1998).
Bezryadin et al., "Multiprobe Transport Experiments on Individual Single-Wall Carbon Nanotubes," Physical Review Letters, 80, 4036-4039 (1998).
Nardelli et al., "Mechanical deformations and coherent transport in carbon nanotubes", Physical Review B, 60, 16334-16341 (1999).
Peng et al., "Chemical control of nanotube electronics," Nanotechnology, 11, 57-60 (2000).
Tombler et al., "Reversible electromechanical characteristics of carbon nanotubes under local-probe manipulation," Nature, 405, 769-772 (2000).
Baughman et al., "Carbon Nanotube Actuators," Science, 284, 1340-1344 (1999).
Kong et al., "Nanotube Molecular Wires as Chemical Sensors," Science, 287, pp. 622-625 (2000).
Collins et al., "Extreme Oxygen Sensitivity of Electronic Properties of Carbon Nanotubes," Science, 287, pp. 1801-1804 (2000).
Ghosh et al., "Carbon Nanotube Flow Sensors," Science, 299, pp. 1042-1044 (2003).
Hadjiev et al., "Raman scattering test of single-wall carbon nanotube composites," Applied. Physics Letters, 78, 3193-3195 (2001).
Li et al., "Carbon Nanotube Film Sensor," Advanced Materials, Submitted (2003).

Wagner et al., "Stress-induced fragmentation of multiwall carbon nanotubes in a polymer matrix," Applied Physics Letters, 72, 188-190 (1998).
Schadler et al., "Load transfer in carbon nanotube epoxy composites," Applied Physics Letters, 73, 3842-3844 (1998).
Zhao et al., "The Use of Carbon Nanotubes to Sense Matrix Stresses Around a Single Glass Fiber," Composites Sci. & Tech., 61, pp. 2139-2143 (2001).
Zhao et al., "Direction-Sensitive Strain Mapping with Carbon Nanotube Sensors," Composites Sci. & Tech., 62, pp. 147-150 (2002).
Liu et al., "Fullerene Pipes," Science, 280, pp. 1253-1256 (1998).
Chen et al., "Solution Properties of Single-Walled Carbon nanotubes," Science, 282, pp. 95-98 (1998).
Khabashesku et al., "Fluorination of Single-Wall Carbon Nanotubes and Subsequent Derivatization Reactions," Acc. Chem. Res., 35, pp. 1087-1095 (2002).
Sun et al., "Functionalized Carbon Nanotubes: Properties and Applications," Acc. Chem. Res., 35, pp. 1096-1104 (2002).
Holzinger et al., "Sidewall Functionalization of Carbon Nanotubes," Angew. Chem. Int. Ed., 40(21), pp. 4002-4005 (2001).
Bahr et al., "Covalent chemistry of single-wall carbon nanotubes," J. Mater. Chem., 12, pp. 1952-1958 (2002).
Gu et al., "Cutting Single-Wall Carbon Nanotubes through Fluorination," Nano Letters, 2(9), pp. 1009-1013 (2002).
O'Connell et al., "Reversible water-solubilization of single-walled carbon nanotubes by polymer wrapping," Chem. Phys. Lett., 342, pp. 265-271 (2001).
Rinzler et al., "Large-Scale Purification of Single-Walled Carbon Nanotubes: Process, Product, and Characterization," Appl. Phys. A, 67, pp. 29-37 (1998).
Zimmerman et al., "Gas-Phase Purification of Single-Wall Carbon Nanotubes," Chem. Mater., 12(5), pp. 1361-1366 (2000).
Chiang et al., "Purification and Characterization of Single-Wall Carbon nanotubes," J. Phys. Chem. B, 105, pp. 1157-1161 (2001).
Chiang et al., "Purification and Characterization of Single-Wall Carbon Nanotubes (SWNTs) Obtained from the Gas-Phase Decomposition of CO (HiPco Process)," J. Phys. Chem. B, 105, pp. 8297-8301 (2001).
Farkas et al., "Length sorting cut single wall carbon nanotubes by high performance liquid chromatography," Chem. Phys. Lett., 363, pp. 111-116 (2002).
Chattopadhyay et al., "A Route for Bulk Separation of Semiconducting from Metallic Single-Wall Carbon nanotubes," J. Am. Chem. Soc., 125, 3370-3375 (2003).
Bachilo et al., "Structure-Assigned Optical Spectra of Single-Walled Carbon Nanotubes," Science, 298, 2361-2366 (2002).
Strano et al., "Electronic Structure Control of Single Walled Carbon Nanotube Functionalization," Science, 301, pp. 1519-1522 (2003).
Suzuki et al., "Photoemission spectroscopy of single-walled carbon nanotube bundles," J. Electron Spectroscopy, vol. 114-116, pp. 225-228 (2001).
O'Connell et al., "Band Gap Fluorescence from Individual Single-Walled Carbon Nanotubes," Science, 297, pp. 593-596 (2002).
Dharap et al., "Nanotube film based on single-wall carbon nanotubes for strain sensing," Nanotechnology, 15(3), pp. 379-382 (2004).
Frogley et al., "Polarized resonance Raman spectroscopy of single-wall carbon nanotubes within a polymer under strain," Physical Review B, 65, 113413-113416 (2002).
Smits, "Measurement of sheet resistivities," 5 The Bell System Technical Journal, (1958), pp. 711-718.
Hone et al., "Electrical and thermal transport properties of magnetically aligned single wall carbon nanotube films," Applied. Physics Letters, 77, 666-668 (2000).
Collins et al., "Extreme Oxygen Sensitivity of Electronic Properties of Carbon Nanotube," Science, 287, pp. 1801-1804 (2000).

* cited by examiner

A

B

SMART MATERIALS: STRAIN SENSING AND STRESS DETERMINATION BY MEANS OF NANOTUBE SENSING SYSTEMS, COMPOSITES, AND DEVICES

CROSS REFERENCE TO RELATED APPLICATIONS

The present application claims priority to U.S. Provisional Application Ser. No. 60/442,134, filed Jan. 23, 2003.

This work was supported by the National Aeronautics and Space Administration, NASA Cooperative Grant No. NCC-1-02038 (URETI); and the Robert A. Welch Foundation, Grant No. C1494.

TECHNICAL FIELD

The present invention relates generally to materials, and more specifically to methods, devices, and articles of manufacture comprising carbon nanotubes, wherein the carbon nanotubes are sensitive to mechanical conditions.

BACKGROUND INFORMATION

Since the discovery of carbon nanotubes in 1991 [Iijima, "Helical microtubules of graphitic carbon," Nature, 354, pp. 56-58 (1991)] and single-wall carbon nanotubes in 1993 [Iijima et al., "Single-shell carbon nanotubes of 1-nm diameter," Nature, 363, pp. 603-605 (1993); Bethune et al., "Cobalt-catalysed growth of carbon nanotubes," Nature, 363, pp. 605-607 (1993)], a substantial amount of research has been carried out involving the synthesis, chemistry, and manipulation of these novel materials. See Ebbesen, "Carbon Nanotubes," Annu. Rev. Mater. Sci., 24, pp. 235-264 (1994); Zhou et al., "Materials Science of Carbon Nanotubes: Fabrication, Integration, and Properties of Macroscopic Structures of Carbon Nanotubes," Acc. Chem. Res., 35(12), pp. 1045-1053 (2002); Dai, "Carbon Nanotubes: Synthesis, Integration, and Properties," Acc. Chem. Res., 35(12), pp. 1035-1044 (2002). The goal of much of this research is to facilitate the exploitation of carbon nanotubes' intriguing properties. See Yakobson et al., "Fullerene Nanotubes: $C_{1,000,000}$ and Beyond," American Scientist, 85, pp. 324-337 (1997); Ajayan, "Nanotubes from Carbon," Chem. Rev., 99, pp. 1787-1799 (1999); Baughman et al., "Carbon Nanotubes—the Route Toward Applications," Science, 297, pp. 787-792 (2002).

The electronic properties of carbon nanotubes have been shown to be perturbed by bending-induced strain, wherein such perturbations manifest themselves in the form of enhanced reactivity. See Ausman et al., "Nanostressing and Mechanochemistry," Nanotechnology, 10, pp. 258-262 (1999); and Ruoff et al., "Mechanical Properties of Carbon Nanotubes: Theoretical Predictions and Experimental Measurements," C. R. Physique, 4 pp. 993-1008 (2003). The electrical properties of carbon nanotubes have also been demonstrated to vary non-linearly when subjected to high pressures, i.e., up to 90 kbar. See Bozhko et al., "Resistance vs. Pressure of Single-Wall Carbon Nanotubes," Appl. Phys. A, 67, pp. 75-77 (1998).

To date, several experiments [Bezryadin et al., "Multiprobe Transport Experiments on Individual Single-Wall Carbon Nanotubes," Physical Review Letters, 80, 4036-4039 (1998); Narderi et al., "TITLE?," Physical Review B, 60, 16334-? (1999); Peng et al., "Chemical control of nanotube electronics," Nanotechnology, 11, 57-60 (2000); Tombler et al., "Reversible electromechanical characteristics of carbon nanotubes under local-probe manipulation," Nature, 405, 769-772 (2000)] have studied the effect of mechanical strains on the electronic properties of SWNTs at the nanoscale. Peng et al. have reported that carbon nanotubes have mechanical deformations such as bending, twisting or flattening, and that these influence their electronic properties. Tombler et al. have concluded that the voltage across a single-wall carbon nanotube can be reduced by two orders of magnitude when it is deformed by an AFM tip. Baughman et al. used carbon nanotube films, also called buckypapers, as actuators. See Baughman et al., "Carbon Nanotube Actuators," Science, 284, 1340-1344 (1999). Results showed that large actuator strains can be achieved by smaller operating voltages compared with ferroelectric and electrostrictive materials.

Electronic perturbations induced by chemical adsorbates have been exploited to produce sensors which respond to the adsorption of a small molecular species with a corresponding change in conductivity and resistance. See Kong et al., "Nanotube Molecular Wires as Chemical Sensors," Science, 287, pp. 622-625 (2000); Collins et al., "Extreme Oxygen Sensitivity of Electronic Properties of Carbon Nanotubes," Science, 287, pp. 1801-1804 (2000); and Cole et al., U.S. patent application, Ser. No. 10/100,440, filed Mar. 18, 2002. More recently, carbon nanotubes have been used as flow sensors, wherein the fluctuating Coulombic field of a liquid flowing past the nanotubes forcibly drags the free charge carriers of the nanotubes, thereby inducing a voltage in the nanotube sample along the direction of the flow. See Ghosh et al., "Carbon Nanotube Flow Sensors," Science, 299, pp. 1042-1044 (2003).

SWNTs are Raman active and many researchers have studied the effect of stress or strain on the Raman active modes. Recently, researchers have presented results indicating a Raman shift at ~1590 cm$^{-1}$, [Hadjiev et al., "Raman scattering test of single-wall carbon nanotube composites," Applied. Physics Letters, 78, 3193-3195 (2001); Li et al., "Carbon Nanotube Film Sensor," Advanced Materials, Submitted (2003)] termed as the G band shift, due to tensile strain in the nanotubes. Similar Raman studies on multi-wall carbon nanotubes have also been reported. See Wagner et al., "Stress-induced fragmentation of multiwall carbon nanotubes in a polymer matrix," Applied Physics Letters, 72, 188-190 (1998); and Schadler et al., "Load transfer in carbon nanotube epoxy composites," Applied Physics Letters, 73, 3842-3844 (1998). Wagner and co-workers have shown that Raman spectroscopy can be used as a probe of stress in polymer composites comprising carbon nanotubes by observing a shift in wavenumber of the disorder-induced Raman D* band (~2610 cm$^{-1}$) of SWNTs, which reflects a breathing vibrational mode in graphite, and which has been observed to shift linearly with elastic matrix strain. See Zhao et al., "The Use of Carbon Nanotubes to Sense Matrix Stresses Around a Single Glass Fiber," Composites Sci. & Tech., 61, pp. 2139-2143 (2001); and Zhao et al., "Direction-Sensitive Strain Mapping with Carbon Nanotube Sensors," Composites Sci. & Tech., 62, pp. 147-150 (2002). However, Raman spectroscopy is an arduous process requiring sensitive, sophisticated equipment. Moreover, this technique relies on perturbations in the vibrational modes of carbon nanotubes, not merely on perturbations of their electronic structure.

A sensor, capable of detecting and monitoring mechanical stress/strain at the macroscale, which is sensitive to electronic perturbations manifested in electrical, optoelectronic, or luminescent changes, would be very beneficial. Such sensors would have tremendous impact in structural applications ranging from automotive to aerospace to residential and commercial construction.

SUMMARY

The present invention is directed toward devices comprising carbon nanotubes that are capable of detecting displacement, impact, stress, and/or strain in themselves or in materials or articles of manufacture, methods of making such devices, methods for sensing/detecting/monitoring displacement, impact, stress, and/or strain via carbon nanotubes, and various applications for such methods and devices. The devices and methods of the present invention generally rely on mechanically-induced electronic perturbations within the carbon nanotubes to detect and quantify such stress/strain. Such detection and quantification can rely on techniques which include, but are not limited to, electrical conductivity/conductance and/or resistivity/resistance detection/measurements, thermal conductivity detection/measurements, electroluminescence detection/measurements, photoluminescence detection/measurements, and combinations thereof. All such techniques rely on an understanding of how such properties change in response to mechanical stress and/or strain.

In some embodiments, the devices (also referred to hereafter as "sensors") and methods of the present invention comprise a plurality of carbon nanotubes and probe electrodes attached to said carbon nanotubes. In some embodiments, these electrodes are attached at only two points, whereas in other embodiments, they are attached at four points (i.e., a four-point probe). Such probe electrodes serve to identify and/or quantify displacement, stress, and strain by changes in the electrical properties of the carbon nanotube sensor based upon changes detected by some type of voltage or multimeter device via contact through the probe electrodes.

In some embodiments, the sensor and methods of the present invention comprise a source of electromagnetic (EM) radiation. Such radiation can induce either photocurrent (which can be measured by the electrical probes) or photoluminescence. In some embodiments, the sensor further comprises a spectral analyzer and/or detector. Such an analyzer/detector can be used to analyze/detect both photoluminescence and/or electroluminescence.

In some embodiments, the sensor and methods of the present invention comprise a source of heat and a thermal conductivity detector. In such embodiments, sensing of mechanical conditions relies on changes in thermal conductivity across a region of the sensor as a result of some kind of displacement, stress, or strain.

In some embodiments of the present invention, the sensor comprises a mat, film, or "buckypaper" of carbon nanotubes. In some embodiments, the carbon nanotubes are dispersed and/or blended with another material, possibly forming a composite material. In some embodiments, the carbon nanotubes are refined and/or chemically or physically modified in an effort to tune their electronic properties and/or facilitate their inclusion into other materials. In some embodiments, the inclusion of such carbon nanotube-based sensors in other materials provides for a multi-functional utility. In these embodiments, in addition to the sensing ability provided, the carbon nanotubes may impart other properties such as increased strength, better thermal management, etc.

In some embodiments, the sensors of the present invention are attached or added to a surface of a material being sensed for mechanical stress and/or strain. In some of these embodiments, the sensor can be made to move, be moved, or migrate across the surface as necessary. Alternatively, or in addition to the previous embodiments, in some embodiments the sensors of the present invention can be imbedded in or integrated into the material or materials being sensed.

In some embodiments, the sensors of the present invention are exceedingly small—having dimensions qualifying them as micro-electrical mechanical systems (MEMS), or even nano-electrical mechanical systems (NEMS). Numerous such devices may be used to sense stress/strain within a material. In other embodiments, a single sensor may comprise a coating or film covering a large surface area.

The sensors and methods of the present invention are applicable to any field where stress/strain/displacement sensing and monitoring may find application. Such sensors can be used for distributed sensing to divert critical loading conditions, wherein they can be made to sense damage, initiate protection systems (e.g., airbags, deployable shields, etc.), control loads, analyze loads, and control the various systems. Furthermore, such easily integratable devices may find application in heretofore unconsidered realms because they overcome previous manufacturing constraints (e.g., cost, size, integratability, etc.). Exemplary uses for such sensors include, but are not limited to, stress and strain detection in airplanes, spacecraft, automobiles, buildings, bridges, dams, and other structures.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
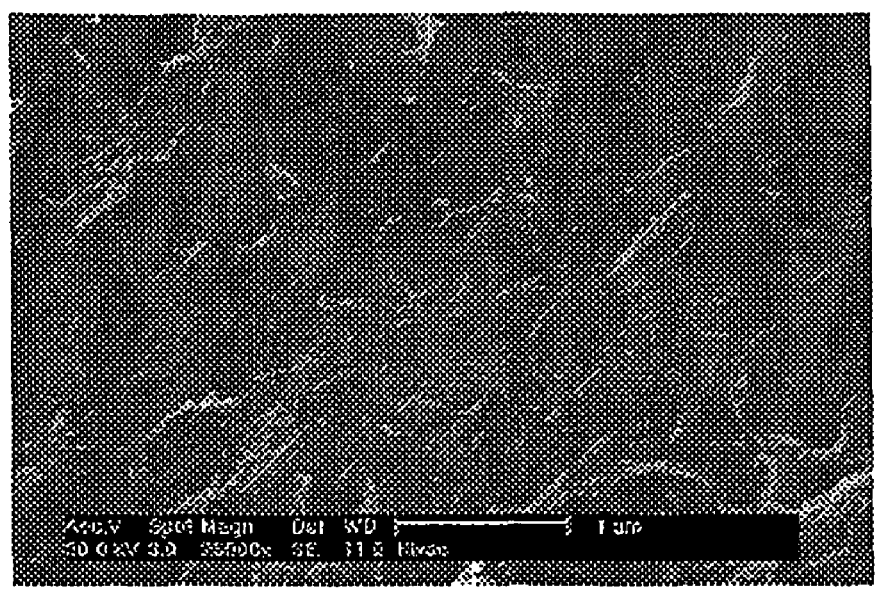
FIG. 1 depicts SEM images of the films, wherein (a) is a carbon nanotube film made up of entangled bundles of SWNT, and (b) shows the thickness of the carbon nanotube film.
Figure 1:
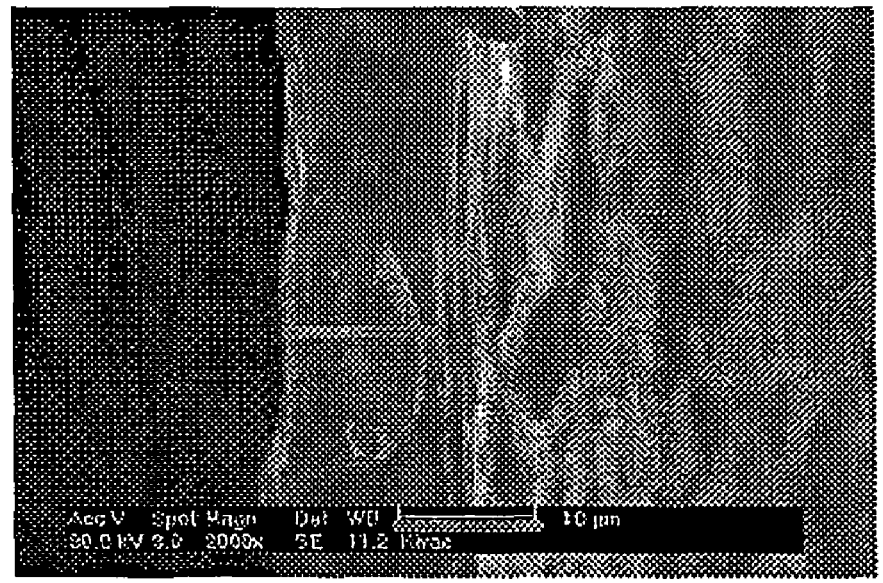

As stated above, the present invention is directed toward devices comprising carbon nanotubes that are capable of detecting displacement, impact, stress, and/or strain (i.e., mechanical conditions) in materials, methods of making such devices, methods for sensing/detecting/monitoring displacement, stress, and/or strain via carbon nanotubes, and various applications for such methods and devices. The novelty of such devices and methods resides in their reliance on mechanically-induced electronic perturbations within the carbon nanotubes to detect and quantify such stress/strain.

"Mechanical conditions," as used herein, are conditions induced within materials or objects via the application of some kind of mechanical force. Such conditions include, but are not limited to, displacement, stress, and strain. Such mechanical conditions can also be induced as a result of changes in the integrity of a material induced by some other type of chemical or physical means (e.g., corrosion, lightning damage, etc.). "Displacement," as used herein, generally refers to some kind of translation of a portion of a material or object relative to the material or object as a whole.

As used herein, a "sensor" is a device which can both detect and monitor (continuous detection or detection at discrete intervals over a period of time). Such sensors can also be made to "quantify," i.e., measure, that which they are sensing by relating responses to stresses, strains, and/or displacements of known value. Such relation is termed "calibration." The "sensing element," according to the present invention, is the part of the device which is responsive to mechanical conditions or changes in mechanical conditions. According to the present invention, the sensing element comprises carbon nanotubes, but may also comprise other material which may or may not serve an active role in the sensing process.

Carbon nanotubes (CNTs), according to the present invention, can be made by any known technique (e.g., arc method, laser oven, chemical vapor deposition, flames, HiPco, etc.) and can be in a variety of forms, e.g., soot, powder, fibers, "bucky papers," etc. Such carbon nanotubes include, but are not limited to, single-wall carbon nanotubes (SWNTs), multi-wall carbon nanotubes (MWNTs), double-wall carbon nanotubes, buckytubes, fullerene tubes, carbon fibrils, carbon nanotubules, carbon nanofibers, vapor-grown carbon fibers, and combination thereof. They may comprise a variety of lengths, diameters, chiralities (helicities), number of walls, and they may be either open or capped at their ends. Furthermore, they may be chemically functionalized in a variety of manners, wherein such chemical functionalization may serve to tune the electronic properties of said nanotubes and/or it may serve to facilitate the manipulation of said nanotubes.

Chemically functionalized carbon nanotubes, according to the present invention, comprise the chemical modification of any of the above-described carbon nanotubes. Such modifications can involve the nanotube ends, sidewalls, or both. Chemical modification, according to the present invention, includes, but is not limited to, covalent bonding, ionic bonding, chemisorption, intercalation, surfactant interactions, polymer wrapping, cutting, solvation, and combinations thereof. For some exemplary kinds of chemical modifications, see Liu et al., "Fullerene Pipes," Science, 280, pp. 1253-1256 (1998); Chen et al., "Solution Properties of Single-Walled Carbon nanotubes,". Science, 282, pp. 95-98 (1998); Khabashesku et al., "Fluorination of Single-Wall Carbon Nanotubes and Subsequent Derivatization Reactions," Acc. Chem. Res., 35, pp. 1087-1095 (2002); Sun et al., "Functionalized Carbon Nanotubes: Properties and Applications," Acc. Chem. Res., 35, pp. 1096-1104 (2002); Holzinger et al., "Sidewall Functionalization of Carbon Nanotubes," Angew. Chem. Int. Ed., 40(21), pp. 4002-4005 (2001); Bahr et al., "Covalent chemistry of single-wall carbon nanotubes," J. Mater. Chem., 12, pp. 1952-1958 (2002); Gu et al., "Cutting Single-Wall Carbon Nanotubes through Fluorination," Nano Letters, 2(9), pp. 1009-1013 (2002), O'Connell et al., "Reversible water-solubilization of single-walled carbon nanotubes by polymer wrapping," Chem. Phys. Lett., 342, pp. 265-271, (2001).

The carbon nanotubes used in the devices and methods of the present invention can also be physically modified by techniques including, but not limited to, physisorption, plasma treatment, radiation treatment, heat treatment, pressure treatment, and combinations thereof, prior to being incorporated into the devices of the present invention or treated according to the methods of the present invention. In some embodiments of the present invention, carbon nanotubes have been both chemically and physically modified, prior to being treated according to the methods of the present invention.

Carbon nanotubes, as used in the devices and methods of the present invention, can be in their raw, as-produced form, or they can be purified by a purification technique. Furthermore, mixtures of raw and purified carbon nanotubes may be used. For some exemplary methods of carbon nanotube purification, see Rinzler et al., "Large-Scale Purification of Single-Walled Carbon Nanotubes: Process, Product, and Characterization," Appl. Phys. A, 67, pp. 29-37 (1998); Zimmerman et al., "Gas-Phase Purification of Single-Wall Carbon Nanotubes," Chem. Mater., 12(5), pp. 1361-1366 (2000); Chiang et al., "Purification and Characterization of Single-Wall Carbon nanotubes," J. Phys. Chem. B, 105, pp. 1157-1161 (2001); Chiang et al., "Purification and Characterization of Single-Wall Carbon Nanotubes (SWNTs) Obtained from the Gas-Phase Decomposition of CO (WiPco Process)," J. Phys. Chem. B, 105, pp. 8297-8301 (2001).

Generally, the present invention provides for devices and methods that can sense and/or analyze mechanical conditions on or within objects or material. In the devices and methods of the present invention, carbon nanotubes play a vital role in the sensing and analysis of mechanical conditions. Changes in the electronic structure of the carbon nanotubes as a result of deformations (as small as the molecular level) induced by mechanical conditions provide the sensing capability. Such changes in the electronic structure as a result of such deformations can be detected via changes in their electronic properties, their thermal properties, and their photoluminescence properties. While the devices of the present invention can be distinct from the objects or materials they are sensing, they can also be an inherent part or parts of the object or material.

To analyze mechanical conditions in a quantifiable manner, data must be compiled which correlates detectable thermal, electronic, and photoluminescence properties with fully understood mechanical conditions. Such understanding requires knowledge of the mechanical conditions' value, as well as a complete understanding of the environment (temperature, pressure, atmosphere, etc.) in which the correlatable data is obtained. Such data compilations or data bases may contain up to the tens of thousands (or more) of data points and computational hardware and software may be used to access and retrieve such information. Such information provides for a calibration measure by which observed thermal, electronic, and photoluminescence properties in unknown circumstances can be compared to and quantified. Such a database of calibration data is key to understanding the responses generated by the sensing element in response to various mechanical conditions.

In some embodiments, the carbon nanotubes used in the devices and methods of the present invention may be separated on the basis of a property selected from the group consisting of length, diameter, chirality, electrical conductivity, number of walls, and combinations thereof, prior to being treated or utilized according to the methods and devices of the present invention. See Farkas et al., "Length sorting cut single wall carbon nanotubes by high performance liquid chromatography," Chem. Phys. Lett., 363, pp. 111-116 (2002); Chattopadhyay et al., "A Route for Bulk Separation of Semiconducting from Metallic Single-Wall Carbon nanotubes," J. Am. Chem. Soc., 125, 3370-3375 (2003); Bachilo et al., "Structure-Assigned Optical Spectra of Single-Walled Carbon Nanotubes," Science, 298, 2361-2366 (2002); Strano et al., "Electronic Structure Control of Single Walled Carbon Nanotube Functionalization," Science, 301, pp. 1519-1522 (2003).

In some embodiments, the present invention is directed to a method for detecting and measuring mechanical conditions. Such mechanical conditions include, but are not limited to, stress, strain, displacement, and combinations thereof. Such methods can comprise a number of steps including: selecting a plurality of carbon nanotubes; attaching to the carbon nanotube(s) an electrical probe; exposing the carbon nanotube(s) to a mechanical condition; measuring a change in an electrical property of the carbon nanotube(s) with the electrical probe; and optionally comparing this electrical property change to a database which correlates electrical property changes with mechanical conditions in a quantifiable manner so as to assign a value to this mechanical condition based on this comparison.

Electrical properties, according to the present invention, include, but are not limited to, resistivity, resistance, conductivity, conductance, and combinations thereof. Electrical probes, according to the present invention, can be any device which suitably detects electrical properties in a measurable way. The electrical probe generally comprises two or more electrodes and a power supply. In some embodiments, the electrical probe is a four-point probe. A multimeter is another type of electrical probe that can be used in some embodiments of the present invention.

In some embodiments, the present invention is directed toward a device (i.e., a sensor) for detecting and measuring mechanical conditions generally comprising: a plurality of carbon nanotubes; an electrical probe connected to the nanotube; and, optionally, an accessible database of information which correlates electrical measurements made with the electrical probe to mechanical conditions in a quantifiable manner based upon previously measured standards. The electrical probe, according to the present invention, can be any type of electrical probe which suitably measures changes in the electrical properties of the carbon nanotubes as a result of being subjected to one or more mechanical conditions. In some embodiments, the electrical problem is a four-point probe.

It is known that electronic perturbations of carbon nanotubes can result in alterations of their photoluminescence spectra. See Suzuki et al, "Photoemission spectroscopy of single-walled carbon nanotube bundles," J. Electron Spectroscopy, vol. 114-116, pp. 225-228 (2001); and O'Connell et al., "Band Gap Fluorescence from Individual Single-Walled Carbon Nanotubes," Science, 297, pp. 593-596 (2002). Using such knowledge, Applicants have devised methods for sensing/measuring mechanical conditions via photoluminescence. Such methods generally comprise the following steps: selecting a plurality of carbon nanotubes; irradiating the carbon nanotube(s) with a source of EM radiation and detecting and/or analyzing the resulting photoluminescence (photoemission); exposing the carbon nanotube(s) to a mechanical condition; detecting/measuring a change in the photoluminescence; and optionally comparing this photoluminescence change to a database which correlates photoluminescence changes with mechanical conditions in a quantifiable manner so as to assign a value to this mechanical condition based on this comparison.

Accordingly, the present invention is also directed toward devices (sensors) for sensing/measuring mechanical conditions via photoluminescence. Such devices generally comprise: a plurality of carbon nanotubes; a source of EM radiation; a detector and/or spectral analyzer for detecting/analyzing photoluminescence; and, optionally, an accessible database of information which correlates changes in photoluminescent properties of the carbon nanotubes to mechanical conditions in a quantifiable manner based upon previously measured standards.

For the methods and devices correlating photoluminescence with mechanical conditions, the source of EM radiation can be any source which suitably provides for a detectable photoluminescence change when the sensing element comprising carbon nanotubes experiences a mechanical condition. Such a source of EM radiation can be monochromatic, polychromatic, and combinations thereof. In some embodiments, the source of EM radiation is a laser. In general, the EM wavelengths useful for irradiating the carbon nanotube sensor in an effort to induce photoluminescence range from about 2 μm to about 100 nm.

The detector or detectors used in the methods and devices correlating photoluminescence with mechanical conditions can be any detector(s) capable of detecting photoluminescence changes according to the present invention. Such detectors include, but are not limited to, photodiodes, photodiode arrays, photomultiplier tubes, PbS detectors, MCT (HgCdTe) detectors, and combinations thereof. In some embodiments, multiple detectors are used.

In some embodiments, a spectral analyzer is used to analyze changes in photoluminescence. Spectral analyzers, according to the present invention, include, but are not limited to, prisms, gratings, holographic gratings, monochrometers, spectral filters, and combinations thereof. In some embodiments, multiple spectral analyzers are used. In some embodiments, the spectral analyzer is capable of doing multispectral "spatial" analyses.

The present invention is directed to methods in which mechanical conditions, as outlined herein, can be sensed via monitoring changes in the thermal conductivity of sensing elements comprising carbon nanotubes. Deformations of carbon nanotubes at the molecular level manifest themselves as changes in thermal conductivity at the macroscale. These deformations are induced by mechanical conditions applied to the sensor or object or material to which the sensor is attached to or integrated with. Such methods generally comprise: the application of thermal energy (i.e., heat) to one region of a sensor comprising carbon nanotubes, and then monitoring the dissipation or transport of the thermal energy to another region of the sensor.

The present invention is also directed to devices capable of sensing mechanical conditions via monitoring changes in thermal conductivity within a sensing element comprising carbon nanotubes. Such devices generally comprise, in addition to the sensing element comprising carbon nanotubes, an external source of heat and a thermal conductivity detector. A thermal conductivity detector can be any thermal conductivity detector that suitably provides for the detection of thermal conductivity—in either a direct or indirect manner—according to the methods and devices of the present invention. In some embodiments, a thermal conductivity detector is a thermocouple.

According to the present invention, carbon nanotubes serve as the sensing element (or as part of the sensing element) in the sensors and methods described herein. In the embodiments that follow, the variations described can be viewed as being applicable to any or all of the above-described methods, devices, or combinations of methods and devices.

In some embodiments, the sensor comprises a sensing element comprising carbon nanotubes and another material. Such other materials include, but are not limited to, glass fibers, ceramic fibers, polymers, spherical particles, and combinations thereof. In some embodiments, these materials are inert, whereas in other embodiments, at least some of these materials play an active role in the sensing process. In some of these embodiments, the carbon nanotubes are incorporated into or with said other material. Methods of incorporating carbon nanotubes into or with such other materials (for any application) include, but are not limited to, ink jet printing, spraying, shear mixing, spin coating, dip coating, incipient wetting, co-polymerization, and combinations thereof.

In some embodiments, the plurality of carbon nanotubes used in the devices and methods of the present invention are in a particular form. Such forms include, but are not limited to, a mat, a film, an array, a bucky-paper, and combinations thereof. In some embodiments the carbon nanotubes are chemically-derivatized. In some embodiments, the carbon nanotubes are aligned.

In some embodiments, the carbon nanotubes are added to or attached to a material so as to sense mechanical conditions at the surface of the material. In some embodiments they are attached to one or more materials (collectively making up the sensing element) prior to being attached to the material being sensed. In some embodiments, a coating or "skin" comprising carbon nanotubes is applied to a surface. In other embodiments, the carbon nanotubes are incorporated with or embedded into another material, this other material being the same or a material different from the material being sensed. In some embodiments, the carbon nanotubes are incorporated into the material or article of manufacture being sensed. In some embodiments, the carbon nanotubes are arranged in a two-dimensional manner, a three-dimensional manner, or a combination of the two. Carbon nanotubes in such matrices can be oriented isotropically, anisotropically, or both. Such orientation can be engineered to sense in one or multiple directions and can be made to enhance sensitivity in one or more directions. Incorporation such as this can be achieved via dispersion, blending, or other processes.

In some embodiments of the present invention, the sensors are very small and can be considered micro-electromechanical systems (MEMS) or even nano-electromechanical systems (NEMS). In some embodiments, the sensors and methods of the present invention are made to work with other types of MEMS or NEMS devices. Despite the small size of some of these sensors, they can still be made to sense mechanical conditions in large objects (e.g., buildings or airplanes) by strategically positioning them, making them mobile, and/or utilizing large numbers of them. In still other embodiments, the sensors can be made with macroscopic dimensions. Furthermore, the sensors of the present invention can be made to sense mechanical conditions in multiple directions—either sequentially or all at once. Such multi-directional sensing can be generated with multiple sensors or sensing elements, or with a single sensor.

In some embodiments, the carbon nanotubes used in the devices and methods of the present invention are refined and/or chemically or physically modified—prior to being used in the devices and/or methods of the present invention—so as to tune their electronic properties and/or facilitate their inclusion into other materials. In some embodiments, the modification is removed or reversed after inclusion into a sensing device of the present invention. Such refinement can include isolating and/or separating by length, diameter, chirality, and combinations thereof. Such refinement can include specific amounts or ratios of carbon nanotubes of various type.

In some embodiments of the present invention, the carbon nanotubes serve a multifunctional role. In addition to acting as sensors, the carbon nanotubes can also serve as structural enhancers, scratch-resistant coatings, providers of thermal conductivity for thermal management, providers of electrical conductivity for electrostatic discharge (ESD) management, and combinations thereof In some embodiments, it is the carbon nanotubes in the sensors themselves which provide such additional utility, whereas in other embodiments the sensors comprising carbon nanotubes are mixed together with non-sensing carbon nanotubes whose function is to provide a role other than sensing.

In some embodiments of the present invention, materials into which the sensors comprising carbon nanotubes can be incorporated are polymeric. In some embodiments, carbon nanotubes are incorporated into polymeric materials to make the sensor or sensing element of the present invention. In some embodiments, the sensor or sensing element of the present invention is attached to another material or surface with the aid of a polymeric material. Such polymeric materials, according to the present invention, include, but are not limited to, thermoplastics, thermosets, epoxies, silicones, elastomers, and combinations thereof.

In some embodiments of the present invention, the sensors comprising carbon nanotubes exist in laminates. In some embodiments, the laminate itself is a sensor. In other embodiments, the laminate is the object or material being sensed. Such laminates may comprise only one sensing layer, or they may comprise several layers-imparting to the device the capability of sensing in multiple directions.

In some embodiments of the present invention, materials into which the sensors comprising carbon nanotubes can be incorporated are selected from the group consisting of metals, alloys, semiconductors, metalloids, ceramics, glasses, fibers, and combinations thereof.

The sensors and methods of the present invention are applicable to any field where stress/strain/displacement sensing and monitoring may find application. Exemplary uses for such sensors include, but are not limited to, stress and strain detection in airplanes, spacecraft, automobiles, engines, buildings, bridges, dams, and other structures.

Such easily integratable devices may find application in heretofore unconsidered realms because they overcome previous manufacturing constraints (e.g., cost, size, integratability, etc.). Examples of these unforeseen uses include, but are not limited to, tires, gaskets, scales, and combinations thereof. In the case of automobile tires, carbon black is typically added in amounts as high as 30 weight percent to provide UV protection to the tire. Replacing some or all of this with carbon nanotubes might not only impart the tire with greater strength, but also provide a sensing mechanism to sense when a tire might suffer a blow-out. Thus, the nanotubes serve a multifunctional role.

In some embodiments, the sensors are used as transducers for air bag deployment. In some such embodiments, it is a change in current across a sensor of the present invention as a result of some type of stress or strain which prompts the air bag deployment. Analogous uses include, but are not limited to, parachutes, auto-eject seats, deployable shields, and automatic doors.

The following examples are included to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

This Example serves to illustrate embodiments of the present invention in which add-on sensors comprising a film (i.e., "buckypaper") are used to sense stress and strain. The results put forth in the present Example can be found in a forthcoming publication by Applicants. See Dharap et al., "Nanotube film based on single-wall carbon nanotubes for strain sensing," Nanotechnology, 15(3), pp. 379-382 (2004).

A carbon nanotube film is produced by mixing unpurified SWNTs (obtained from Carbon Nanotechnologies, Inc.) with 0.25 mg/mL N,N-Dimethylformamide (DMF). The mixture is filtered by a 0.2 mm Teflon membrane and dried. The film (buckypaper) is peeled from the filter after drying. Then the film is further dried for 24 hours under vacuum and heat. FIG. 1(a) shows a scanning electron microscope (SEM) image of the carbon nanotube film where it can be seen that the film is composed of mechanically entangled, randomly oriented nanotube bundles that impart it with isotropic electronic properties. See Frogley et al., "Polarized resonance Raman spectroscopy of single-wall carbon nanotubes within a polymer under strain," Physical Review B, 65, 113413-113416 (2002). FIG. 1(b) shows the 10 μm-thick carbon nanotube film, as imaged by SEM.

Figure 2:
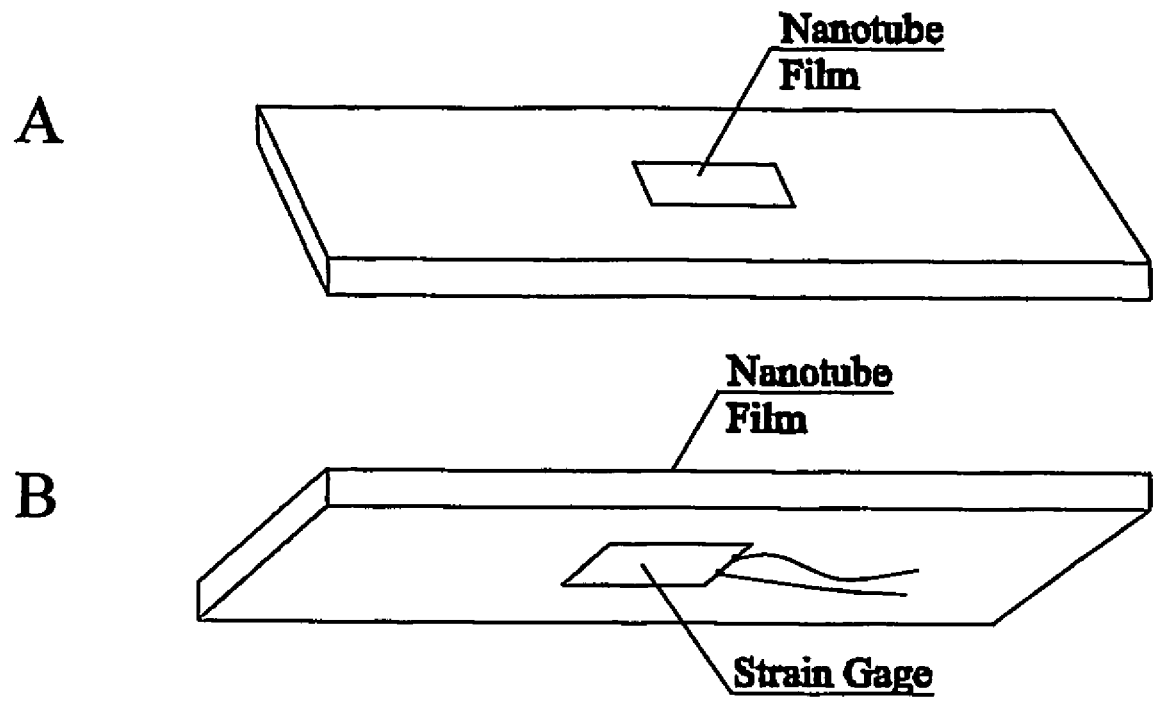
FIG. 2 depicts a sensor of the present invention, wherein (a) shows a carbon nanotube film with insulating PVC film attached to the brass specimen, and (b) shows a metal strain gage attached on the opposite side.
Figure 3:
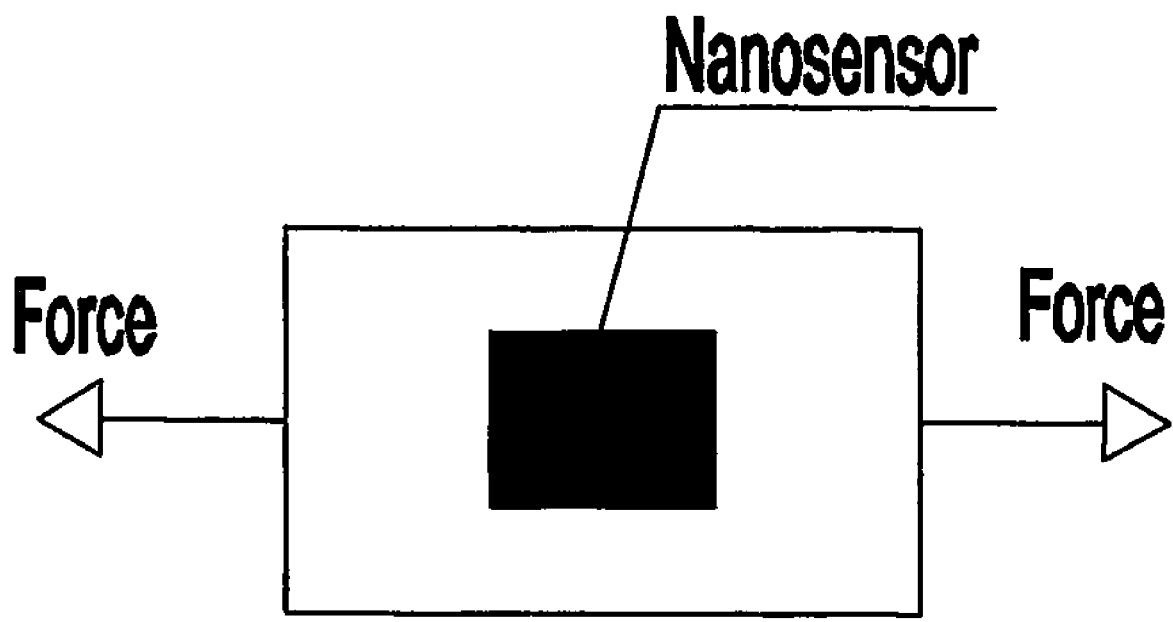
FIG. 3 is a schematic of the brass specimen under tension and compression.

The carbon nanotube film is attached to a 12×1.5×0.25 inch brass specimen having a Young's modulus of 166 GPa and shown in FIG. 2(a). A PVC film is attached between the carbon nanotube film and the conducting brass specimen using a high-strength epoxy to ensure perfect strain transfer and for insulation as shown in FIG. 2(a). A vacuum bonding method [http://www.mide.com/pdf's/qn01.pdf] is used to ensure that the epoxy produces a firm, thin, and stiff bond such that no slippage occurs between the brass specimen, the PVC, and the carbon nanotube film. FIG. 2(b) shows an electrical resistance strain gauge attached to the brass specimen, on the opposite side of the brass specimen, for strain measurement comparisons. A schematic of the brass specimen is shown in FIG. 3.

A four-point probe is used to measure voltage change in the carbon nanotube film. The brass specimens are subjected to tension as well as compression cycles in a servo hydraulic test frame, and a current is passed through the outer two probes. Proper contact between the probes and the film is ensured so that voltage across the inner two probes is stable. Load is applied incrementally and held constant for several seconds at each interval until stable readings can be obtained. Input current across two outer probes is kept constant during the measurement and change in voltage across the two inner probes, as well as the strains from the strain gauge, are measured. The brass specimen is in the elastic range during the tension and compression cycles.

The change in voltage varies nearly linearly for specimens subjected to both tension and compression cycles as shown in FIG. 4(a). For comparison, the change in voltage across the inner two probes for the carbon nanotube film is plotted against the strain readings from the conventional strain gauge, as shown in FIG. 4(b). A nearly linear relation exists between the change in voltage measurements obtained from the nanosensor and strain gauge readings. Additionally, the change in voltage is measured using a four point probe in several parallel (i.e., in-line with axial forces) locations on a single carbon nanotube film sensor. Such multi-location sensing also leads to a nearly linear relationship between change in voltage and strain.

The change in voltage across the inner two probes is partly due to changes in the dimensions of the carbon nanotube film, and primarily due to changes in resistivity of the film. Since in the case of the brass specimens, the measured axial tensile strains are on the order of 0.04%, the changes in the dimensions of the film will be small; their contribution to the change in voltage will also be small, which is shown next. The film (sheet) resistivity measured using a four point probe is given by Equation 1 [Smits, "Measurement of sheet resistivities," The Bell System Technical Journal, 5, 711-718 (1958)]:

$$\rho_s = \frac{V}{I} C\left(\frac{a}{d}, \frac{d}{s}\right) \quad (1)$$

where V is the voltage across the inner two probes, I is the input current across the outer two probes, and $$C\left(\frac{a}{d}, \frac{d}{s}\right)$$

is a factor that depends upon the dimension of the film (a is the length of the film, d is the width of the film, and s is the distance between two probes in four point probes). Assuming that resistivity, $\rho_s$, of the carbon nanotube film remains constant as strain changes from 0% to 0.04%.

$$\rho_s = \frac{V_1}{I} C_1\left(\frac{a}{d}, \frac{d}{s}\right) \quad \text{at 0.0\% strain} \quad (2)$$

$$\rho_s = \frac{V_2}{I} C_2\left(\frac{a}{d}, \frac{d}{s}\right) \quad \text{at 0.04\% strain} \quad (3)$$

where $V_1$ and $V_2$ are the voltages across the inner two probes at 0% strain and 0.04% strain respectively. $C_1$ and $C_2$ are corresponding constants depending upon the dimension of the carbon nanotube film. Current I is kept constant. Corresponding constant [Smits] $C_1$=2.190560 at 0% strain and $C_2$=2.190314 at 0.04% strains are obtained. Subtracting equation (2) from equation (3) gives Equation 4:

$$\Delta V = \rho_s I\left(\frac{1}{C_2} - \frac{1}{C_1}\right) = 21(\mu V) \quad (4)$$

Figure 4:
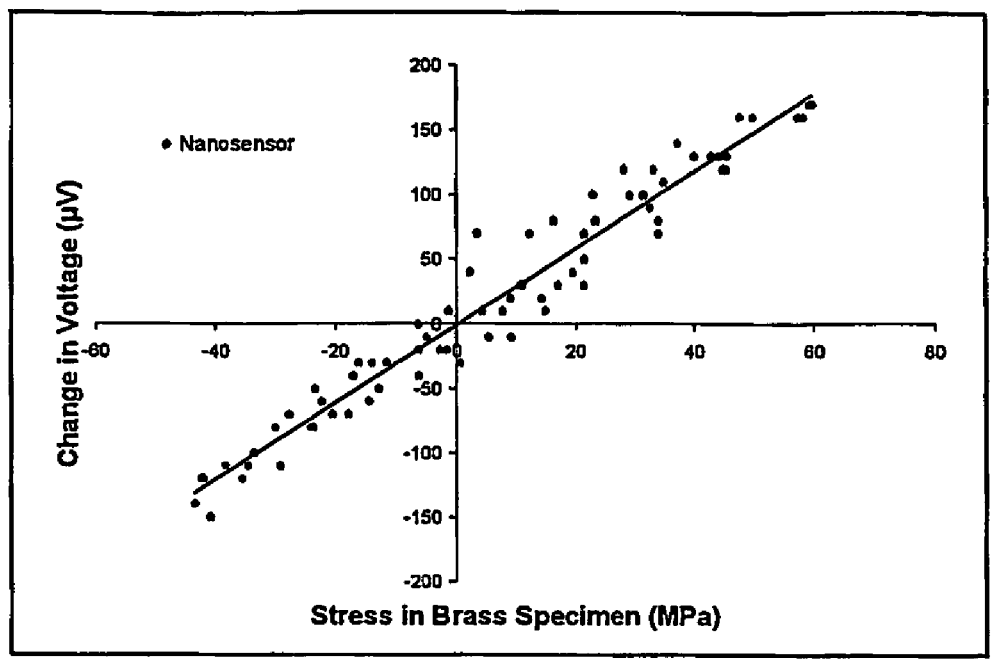
FIG. 4 illustrates, for a specimen subjected to tension and compression cycles, (a) the change in voltage in the carbon nanotube film as a function of stress in brass specimen, and (b) the change in voltage in the carbon nanotube film as a of function strain in brass specimen.
Figure 4:
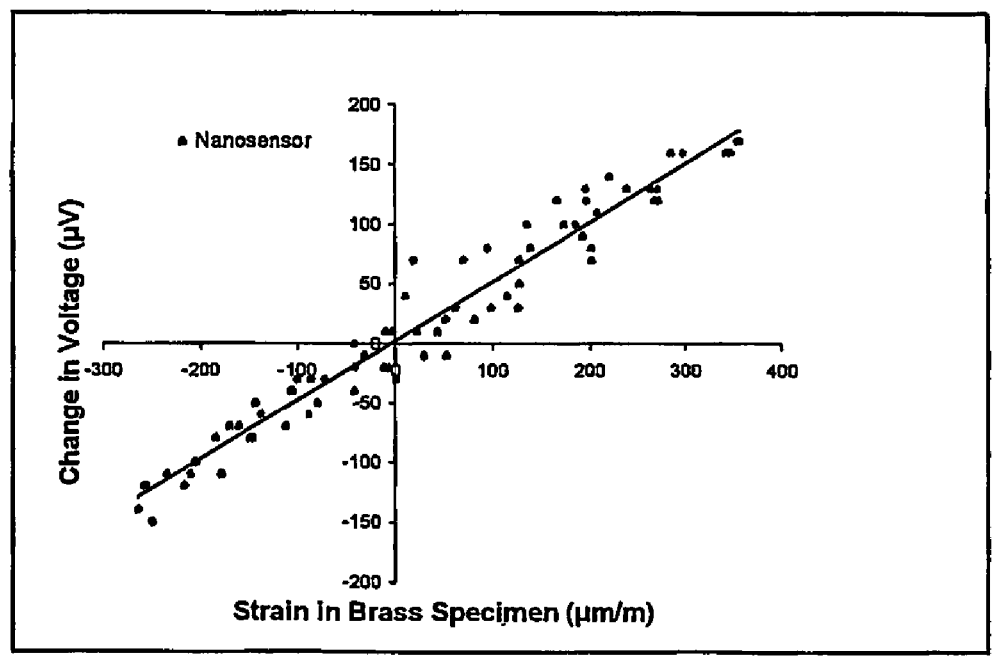

For the results presented in the FIG. 4, the change in voltage is about 170 μV. It can be seen that the change in voltage due to the change in dimension of the carbon nanotube film is small (~12%) and rest of the change in voltage is due to change in resistivity (~88%). Hence, it can be concluded that the change in voltage is mainly due to the change in resistivity of the film.

The deviation from the linear trend in the recorded data shown in FIG. 4(a) needs further investigation. While not intending to be bound by theory, one of the factors for this deviation could be the temperature around the carbon nanotube film during the experiment. Researchers have observed that the resistance of a carbon nanotube changes with temperature. See Hones et al., "Electrical and thermal transport properties of magnetically aligned single wall carbon nanotube films," Applied. Physics Letters, 77, 666-668 (2000); and Bezryadin et al., "Multiprobe Transport Experiments on Individual Single-Wall Carbon Nanotubes," Physical Review Letters, 80, 4036-4039 (1998). Further study is necessary to quantify the effect of temperature on changes in the electronic properties induced by strain. Exposure to different gases is also another factor that affects the electronic properties of the carbon nanotubes. It has been reported that the electronic properties of a given nanotube are not only specified by the diameter and chirality of the nanotube but also by gas exposure history. See Collins et al., "Extreme Oxygen Sensitivity of electronic properties of carbon nanotube," Science, 287, pp. 1801-1804 (2000). Thus, careful control of environmental conditions ensures achieving reproducible responses in the sensors and method of the present invention.

EXAMPLE 2

This Example serves to illustrate how carbon nanotube sensing elements can be incorporated into layered materials like laminates to sense mechanical conditions in multiple directions.

Figure 5:
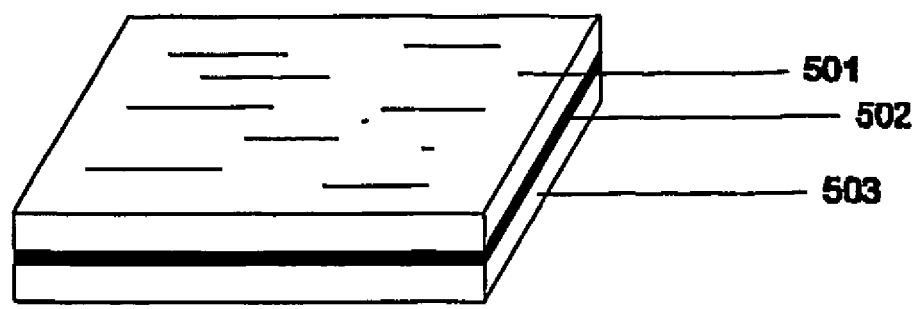
FIG. 5 illustrates, in a functional view (a) and an exploded view (b), an embodiment wherein two sensing element films are laminated together such that the aligned carbon nanotubes in one of the films are perpendicular to the aligned carbon nanotubes in the other film.
Figure 5:
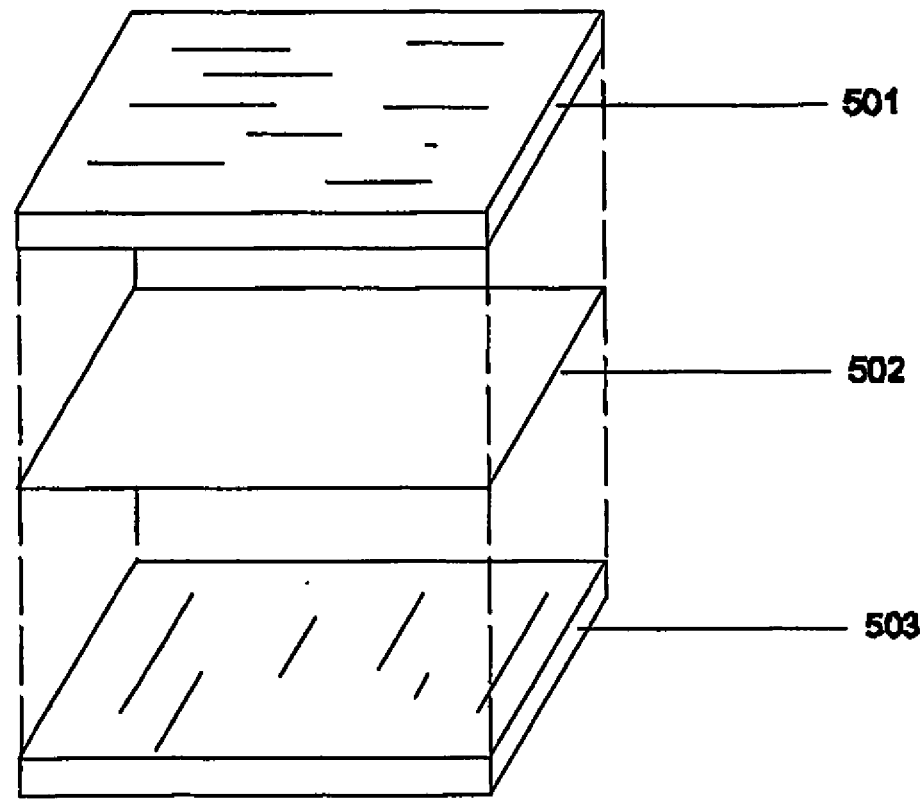

Referring to FIG. 5a (FIG. 5b shows an exploded view), a film 501 comprising carbon nanotubes aligned in one direction is laminated to a film 503 comprising carbon nanotubes oriented in a direction different from that in film 501. Such lamination may comprise an additional laminating agent 502. The films comprising the aligned carbon nanotubes also comprise mylar, although the carbon nanotubes could be used by themselves or with another material. In this particular Example, however, the carbon nanotubes were aligned in the mylar via an extrusion process whereby a blend, comprising about 20 wt. % carbon nanotubes in mylar, is extruded through a sheet extruder. The extrusion process aligns the nanotubes in the direction of the extrusion. A second sheet is fabricated and the two sheets are laminated together in an orientation the renders the nanotubes within each sheet perpendicular to each other. In this example, an epoxy laminating agent serves to affix the two layers together and also provide an electrically-insulating barrier between the two.

Attachment of four-point electrical probes to each of the layers permits enhanced sensing of mechanical conditions in a multi-directional sense. Addition of more layers in the laminate in which the aligned carbon nanotubes are oriented in different directions can further enhance this sensitivity.

EXAMPLE 3

This Example serves to illustrate how carbon nanotube sensing elements can be incorporated into airplane wings (or other parts of the airplane) to serve as indicators of potential structural failure. Such sensors can be potentially useful in detecting damage after lightning strikes an aircraft.

Figure 6:
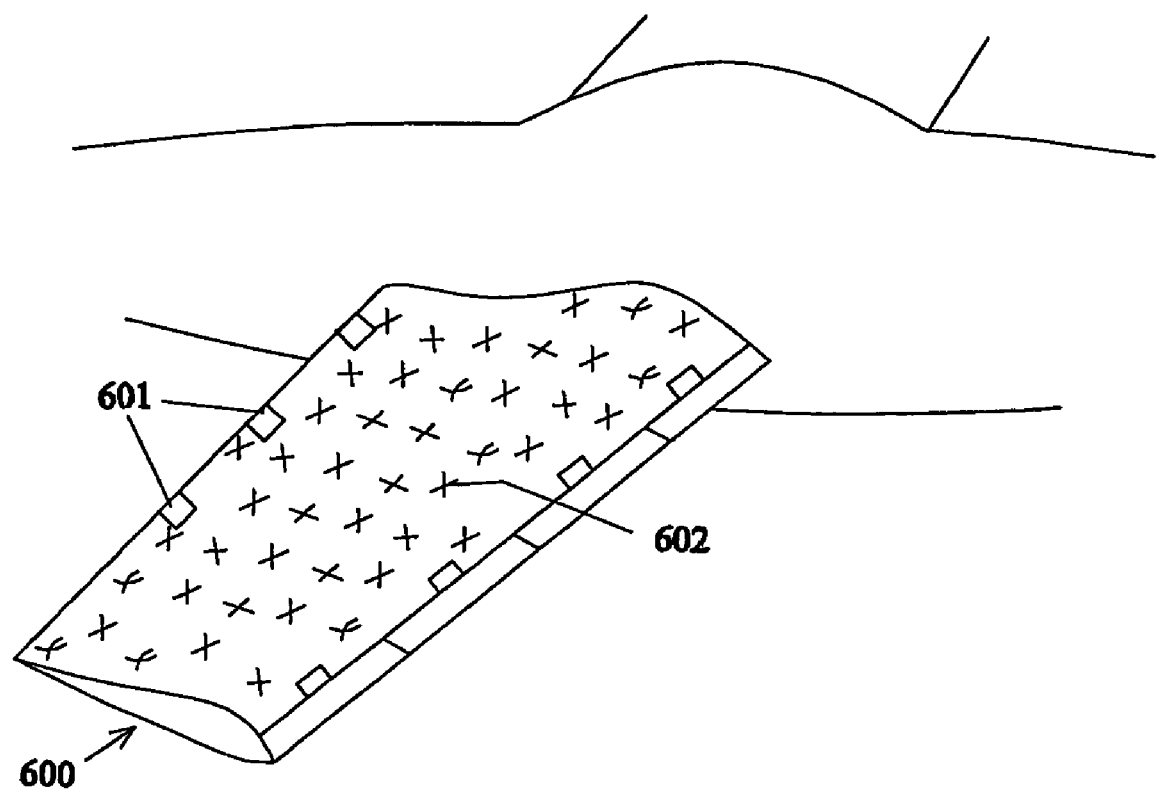
FIG. 6 illustrates an embodiment wherein an extremely large sensor is created, in this case an airplane wing.

Referring to FIG. 6, carbon nanotubes 602 (not drawn to scale) can be isotropically distributed throughout a coating on an airplane's wing 600 (or tail, fuselage, etc.). Attached to this coating are electrodes 601 that can be used to sense changes in electrical properties throughout this coating.

EXAMPLE 4

This Example serves to illustrate how carbon nanotubes can be used in an alternative application such as gaskets.

Figure 7:
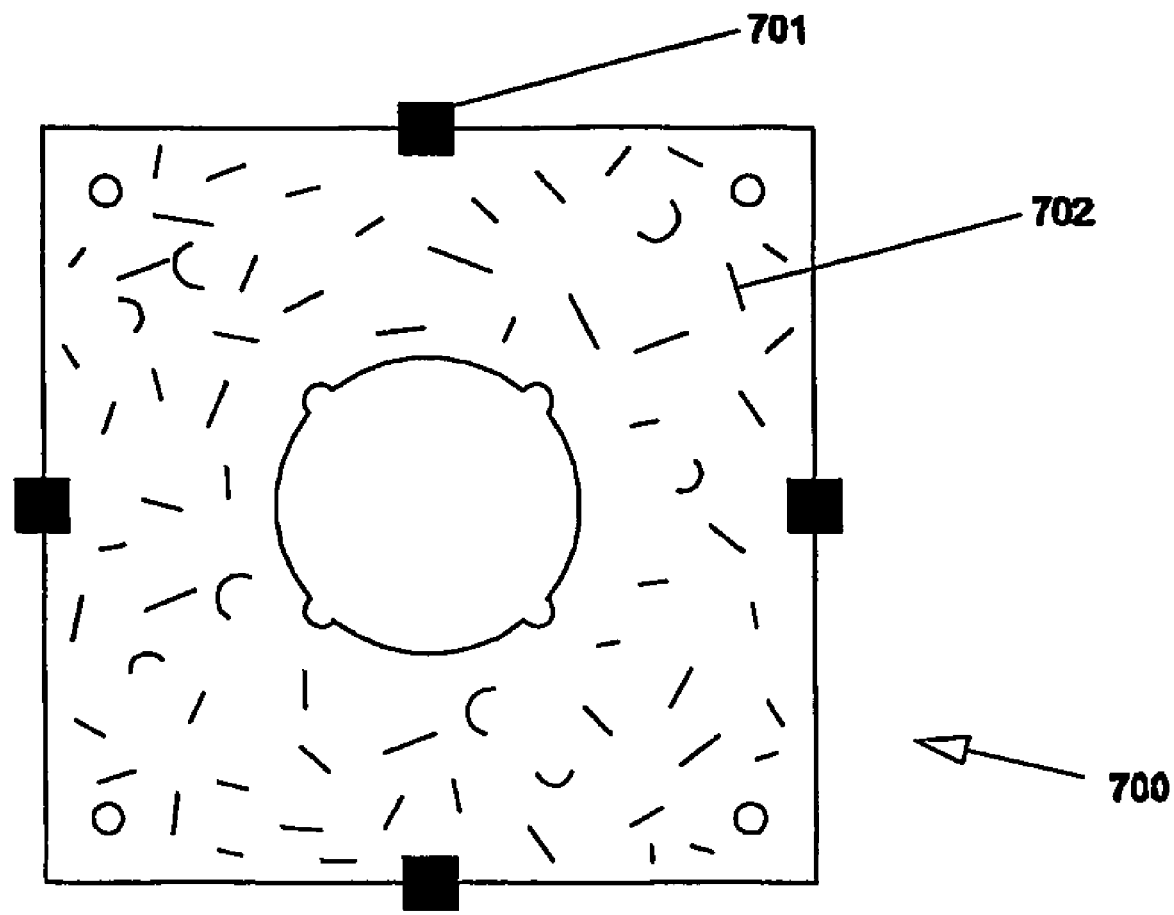
FIG. 7 illustrates an embodiment wherein carbon nanotubes are incorporated into a gasket to function as a sensor of potential gasket failure.

Referring to FIG. 7, a Viton® gasket 700 comprising an isotropic distribution of carbon nanotubes 702 has attached to it an ordered arrangement of electrodes 701. The amount of carbon nanotubes in the Viton® matrix of this Example is about 20 wt. %. When such a gasket begins to fail, pressure inconsistencies will register as changes in electronic properties. For industrial facilities using such gaskets in pipes, a potential rupture may be averted by such gasket-sensors alerting as to the loss of gasket integrity.

EXAMPLE 5

This Example serves to illustrate an embodiment wherein changes in photoluminescence of the sensing element as a result of mechanical conditions can be used to sense displacement, stress, strain, etc.

Figure 8:
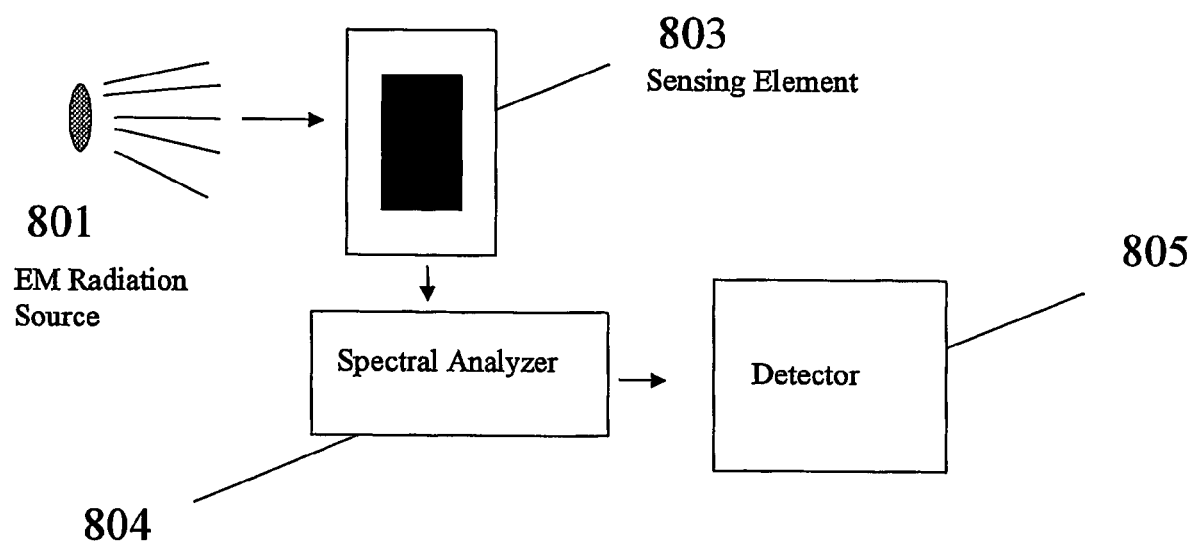
FIG. 8 illustrates one embodiment wherein changes in the photoluminescence of carbon nanotubes can be correlated with mechanical conditions imposed on the sensor comprising the carbon nanotubes.

Referring to FIG. 8, an EM radiation source 801 directs polychromatic radiation to a monochrometer 802 that utilizes a holographic grating to select desired wavelengths which are then directed toward a sensing element 803 comprising carbon nanotubes. The carbon nanotubes naturally absorb light at certain wavelengths, then re-emit them at the same or different wavelengths. A spectral analyzer 804 determines the wavelengths at which the emission is occurring and the detector 805 records the intensity. By understanding how the emission spectrum changes as a direct result of certain mechanical conditions, the mechanical conditions can be evaluated in a quantifiable manner.

Such methods and devices relying on photoluminescence offer some advantages and may be an attractive alternative to sensing changes in electrical properties for some applications. Perhaps most advantages is the ability to do this type of sensing remotely and through glass barriers.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A device for measuring mechanical conditions, wherein the device comprises:
   a sensing element comprising a plurality of carbon nanotubes; and
   an electrical probe in contact with the plurality of carbon nanotubes;
      wherein the electrical probe is sensitive to an electrical property of the carbon nanotubes in a measureable way.

2. The device of claim 1, further comprising:
   computational hardware and software; and
   an accessible database of information which correlates the electrical property to the mechanical conditions in a quantifiable manner based upon previously measured standards.

3. The device of claim 1, wherein the electrical probe is a four-point probe.

4. The device of claim 1, wherein the electrical property is selected from the group consisting of conductivity, resistivity, conductance, resistance, and combinations thereof.

5. The device of claim 1, wherein the mechanical conditions are selected from the group consisting of displacement, impact, stress, strain, and combinations thereof.

6. The device of claim 1, wherein the carbon nanotubes are selected from the group consisting of single-wall carbon nanotubes, multi-wall carbon nanotubes, double-wall carbon nanotubes, carbon fibrils, buckytubes, fullerene tubes, vapor-grown carbon fibers, and combinations thereof.

7. The device of claim 1, wherein the carbon nanotubes have been refined to a desired level of property homogeneity, wherein the property homogeneity is selected from the group consisting of uniform diameter, uniform length, uniform chirality, and combinations thereof.

8. The device of claim 1, wherein the carbon nanotubes have been chemically modified through a modification selected from the group consisting of covalent bonding, ionic bonding, chemisorption, intercalation, surfactant interactions, polymer wrapping, cutting, solvation, and combinations thereof.

9. The device of claim 1, wherein the plurality of carbon nanotubes comprises a form selected from the group consisting of an array, a mat, a bucky-paper, and combinations thereof.

10. The device of claim 1, wherein the carbon nanotubes are incorporated into a matrix material.

11. The device of claim 1, wherein the carbon nanotubes are attached to a material.

12. The device of claim 1, wherein the device is incorporated into an article of manufacture.

13. The device of claim 12, wherein the article of manufacture is selected from the group consisting of airplanes, automobiles, engines, spacecraft, buildings, bridges, dams, and gaskets.

14. The device of claim 1, wherein the device is attached to an article of manufacture.

15. The device of claim 14, wherein the article of manufacture is selected from the group consisting of airplanes, automobiles, engines, spacecraft, buildings, bridges, dams, and gaskets.

16. The device of claim 1, wherein the plurality of carbon nanotubes are arranged in a two-dimensional network.

17. The device of claim 1, wherein the plurality of carbon nanotubes are arranged in a three-dimensional network.

18. The device of claim 1, wherein the carbon nanotubes have been physically modified.

19. A method of measuring mechanical conditions comprising:
    selecting a plurality of carbon nanotubes;
    attaching to the carbon nanotubes an electrical probe;
    exposing the carbon nanotubes to a mechanical condition;
    measuring a change in an electrical property of the carbon nanotubes with the electrical probe;
    comparing this electrical property change to a database which correlates electrical property changes with mechanical conditions in a quantifiable manner; and
    assigning a value to this mechanical condition based on this comparison.

20. The method of claim 19, wherein the carbon nanotubes make up a sensing element that optionally comprises other materials selected from the group consisting of glass fibers, ceramic fibers, polymers, polymeric fibers, carbon fibers, nanotube fibers, spherical particles, and combinations thereof.

21. The method of claim 19, wherein the electrical probe is a four-point probe.

22. The method of claim 19, wherein the electrical probe measures a property selected from the group consisting of conductance, conductivity, resistance, resistivity, and combinations thereof.

23. The method of claim 19, wherein the mechanical conditions are selected from the group consisting of displacement, stress, strain, and combinations thereof.

24. The method of claim 19, wherein the carbon nanotubes are selected from the group consisting of single-wall carbon nanotubes, multi-wall carbon nanotubes, double-wall carbon nanotubes, carbon fibrils, buckytubes, fullerene tubes, vapor-grown carbon fibers, and combinations thereof.

25. The method of claim 19, wherein the carbon nanotubes are in a form selected from the group consisting of an array, a mat, a buckypaper, and combinations thereof.

26. The method of claim 19, wherein said method is used to sense mechanical conditions selected from the group consisting of displacement, impact, stress, strain, and combinations thereof.

* * * * *

UNITED STATES PATENT AND TRADEMARK OFFICE
CERTIFICATE OF CORRECTION

| | | |
|---|---|---|
| PATENT NO. | : 7,730,547 B2 | Page 1 of 1 |
| APPLICATION NO. | : 10/542697 | |
| DATED | : June 1, 2010 | |
| INVENTOR(S) | : Enrique V. Barrera et al. | |

It is certified that error appears in the above-identified patent and that said Letters Patent is hereby corrected as shown below:

Column 1, between lines 10 and 11: add "STATEMENT REGARDING FEDERALLY SPONSORED RESEARCH"

Column 1, lines 11-14: replace [This work was supported by the National Aeronautics and Space Administration, NASA Cooperative Grant No. NCC-1-02038 (URETI); and the Robert A. Welch Foundation, Grant No. C1494] with "This invention was made with government support under Grant No. NCC1-02038, awarded by the National Aeronautics and Space Administration. The Government has certain rights in the invention."

Signed and Sealed this
Twenty-fourth Day of May, 2011

David J. Kappos
*Director of the United States Patent and Trademark Office*